United States Patent
Lyle et al.

(10) Patent No.: US 8,214,440 B2
(45) Date of Patent: Jul. 3, 2012

(54) CONTROLLING THE DISPLAY OF SENSITIVE INFORMATION AND MANAGING VISUAL CLUTTER IN A LIVE SESSION DISPLAY AREA SYSTEM

(75) Inventors: Ruthie D. Lyle, Durham, NC (US); Doris L. Jones, Somerville, MA (US); Corinne M. Ryan, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 928 days.

(21) Appl. No.: 11/733,670

(22) Filed: Apr. 10, 2007

(65) Prior Publication Data

US 2008/0256189 A1   Oct. 16, 2008

(51) Int. Cl.
*G06F 15/16* (2006.01)
(52) U.S. Cl. ........................................ 709/206; 709/204
(58) Field of Classification Search .................. 709/206, 709/204

See application file for complete search history.

(56) References Cited

U.S. PATENT DOCUMENTS

| | | | |
|---|---|---|---|
| 6,324,569 B1 * | 11/2001 | Ogilvie et al. | 709/206 |
| 2003/0021416 A1 * | 1/2003 | Brown et al. | 380/277 |
| 2003/0229722 A1 * | 12/2003 | Beyda | 709/310 |
| 2004/0183829 A1 | 9/2004 | Kontny et al. | |
| 2004/0208303 A1 * | 10/2004 | Rajagopalan et al. | 379/202.01 |
| 2006/0161791 A1 | 7/2006 | Bennett | |
| 2006/0161842 A1 * | 7/2006 | Chen et al. | 715/526 |
| 2007/0016689 A1 * | 1/2007 | Birch | 709/241 |
| 2007/0143423 A1 * | 6/2007 | Kieselbach et al. | 709/206 |

* cited by examiner

*Primary Examiner* — Ashok Patel
*Assistant Examiner* — Lawrence Cosby
(74) *Attorney, Agent, or Firm* — David A. Dagg

(57) ABSTRACT

A system for clearing content displayed in the live session display area of an instant messaging system. The system enables a session participant to clear the content currently visible to each other participant in the session, either immediately, or in response to a criteria such as elapsed time or elapsed time since active in the session. The content that is cleared from the live session display area is not permanently lost, but is only temporarily hidden from the live session display area. The system further enables a local participant to recall such temporarily hidden content back into the live session display area.

17 Claims, 14 Drawing Sheets

CONTROLLING THE DISPLAY OF SENSITIVE INFORMATION AND MANAGING VISUAL CLUTTER IN A LIVE SESSION DISPLAY AREA SYSTEM

FIELD OF THE INVENTION

This present invention relates generally to instant messaging systems, and more specifically to a method and system for controlling the display of sensitive information and managing visual clutter in a live session visual display area.

BACKGROUND OF THE INVENTION

As it is generally known, in computer-based communications, instant messaging systems enable instant communications between two or more people over a communication network such as the Internet. Instant messaging typically requires the use of a client program to provide an instant messaging service. Instant messaging differs from electronic mail ("email") in that conversations happen in real-time. Instant messaging sessions are sometimes referred to as "chat" sessions. Examples of existing instant messaging technologies include Qnext, MSN Messenger, AOL Instant Messenger, Yahoo! Messenger, Skype, Google Talk, .NET Messenger Service, Jabber, QQ, iChat and ICQ, and Internet Relay Chat (IRC).

In existing instant messaging applications, a user first initiates a session with at least one other participant. After the session is initiated, information is passed back and forth between the session participants, and is displayed in a live session display area of the application user interface. The content displayed in an instant messaging session user interface live session display area may be sensitive in nature, such that the session participants would not want someone outside the session to be able to read it. However, the user interface live session display area may remain visible on a session participant's client computer system after the session has ended, thus potentially allowing any sensitive information to be viewed by non-participant users that were not intended to see the information. For example, if a session participant gets up from their computer system without closing the session user interface window, another person may be able to see the session contents while the participant is away from his or her desk, and the session participants would not even know that sensitive session content had been seen by someone else.

Additionally, in many situations, the live session display area of the application user interface can become cluttered with large amounts of content, such as text, images, etc. Sometimes the accumulated visual clutter will make it difficult for the user to read the messages being displayed in the live session display area.

In existing systems, there is no effective mechanism for removing content from the live session display area of an instant messaging system user interface. Existing systems do allow a user to insert several blank lines into the screen manually, but that approach does not remove the currently displayed content—scrolling will bring it back into the live session display area. A user can also close a session and open a new session to remove the live session display area and its current contents from view. However, closing a session is often an inconvenient step to take. Moreover, if the currently displayed session contents to be removed from the live session display area continues to have relevance, then a user may not want to permanently remove it from the session, but only to temporarily clear the live session display area for security and/or readability.

For these reasons it would be desirable to have a new system that allows a user to clear a live session display area provided in an instant messaging system application user interface provided on a participant's client computer system. The system would advantageously allow a user to clear content from the live session display area on a temporary basis, such that the cleared content is not permanently lost but only temporarily removed from the live session display area. Such a system would advantageously help prevent sensitive session contents from being exposed to non-participant users, and/or make subsequent messages more readable.

SUMMARY OF THE INVENTION

To address the above described and other shortcomings of the prior art, a new method and system are disclosed for controlling the display or potentially sensitive content to non-participants, and for managing display clutter in a live session display area of an instant messaging system application user interface. In the disclosed system, a mechanism is provided to an instant messaging session participant for clearing session content displayed in the live session display area of an instant messaging system application user interface. The disclosed system enables a session participant to clear the session content currently displayed to each other participant in the live session within the live session display area of their application user interfaces. The content cleared from the live session display area of the user interface is not permanently lost, but is only temporarily hidden in order to prevent the current live session display area contents from being seen by non-participants, e.g. in the event that a participant leaves the transcript display area up on their computer system display after the session has ended, and/or to make subsequent messages more readable. A mechanism is also provided to participants that enables them to recall such temporarily hidden session contents back into the live session display area.

The application user interface provided by the instant messaging client in an embodiment of the disclosed system includes one or more graphical buttons or the like making the new functionality of the disclosed system available to session participants. A "Clear Text" button in the disclosed system enables a participant to temporarily clear the current live session display area of all participants. In such an embodiment, when a participant clicks on the "Clear Text" button, the other participants may be presented with a pop-up prompt or the like indicating that a clear visible content command has been issued, enabling the receiving participants to accept or reject the clear visible content command. If a participant accepts the clear visible content command, then their live session display area is cleared. Otherwise, if a given participant does not accept the clear visible content command, then their live session display area is not cleared. The live session display area of the requesting participant may, for example, be cleared without such a prompt being issued.

In another embodiment, if a session participant clicks on the "Clear Text" button, then the live session display areas of all other session participants are cleared without any prompting to determine whether they accept the clear visible content command. This embodiment provides a higher level of security in the case where a participant walks away from his or her computer system without closing the instant messaging application user interface for the session, since the other participants still have the ability to clear the absent participant's live transcript display area.

In another embodiment of the disclosed system, an "Expire Text" graphical button or the like is provided in the instant messaging session user interface to provide access to an expire visible content command. When an instant messaging session participant clicks on the "Expire Text" button, the disclosed system causes the content currently displayed in the live session display area of one or more participants to be temporarily removed upon satisfaction of a specified criteria, such as the expiration of an indicated period of time, the detected absence of a participant from the session for an indicated period of time, or some other criteria.

In one embodiment, in the event that a participant clicks on the "Expire Text" button in order to issue an expire content command, then other participants in the session are issued a pop-up prompt indicating that the live session display area contents will expire and be temporarily cleared based upon satisfaction of the specified criteria, e.g. at the end of an indicated period of time. Moreover, the disclosed system may be embodied to allow recipient of the prompt to either accept or reject the expiration of the contents of the live session display area based on the indicated criteria.

In both the case of the clear visible content and expire visible content commands, the cleared content is stored, and will be saved into any transcript history log file for the session. Thus only the user interface for the live session is effected, and the session contents still exists for saving in a session transcript to a log file.

In another embodiment, a "Retrieve" graphical button or the like is provided within the graphical user interface of the instant messaging system to enable a user to retrieve content that has been temporarily hidden from the live session display area. The "Retrieve" button enables a user to retrieve content that was temporarily hidden either through invocation of the clear visible content or expire visible content commands. The disclosed system may further be embodied such that use of the "Retrieve" button results in a pop-up prompt being presented to a local user requiring the local user to pass a challenge, e.g. by entering credentials such as their user name and password, prior to restoration of the contents previously hidden from the live session display area.

In another embodiment of the disclosed system, when a participant issues a clear visible content command, e.g. by clicking on the "Clear Text" button, the issuing participant is alerted with regard to the identities of any other session participants for which the live session display area has not or cannot be cleared, e.g. because such other participants have rejected the clear visible content command when prompted, or because such other participants have previously terminated the instant messaging session on their local client systems, or because those other participants are running software on their computer systems that does not support the feature (e.g. because it is an older version).

Thus there is disclosed a system that allows a user to clear the live session display area provided in an instant messaging system application user interface on a participant's client computer system. The disclosed system advantageously allows a user to clear content from the live session display area on a temporary basis, such that the cleared content is not permanently lost, but is only hidden from the live session display area, e.g. in order to prevent potentially sensitive information from being viewed by a non-participant, and/or to make subsequent messages more readable.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
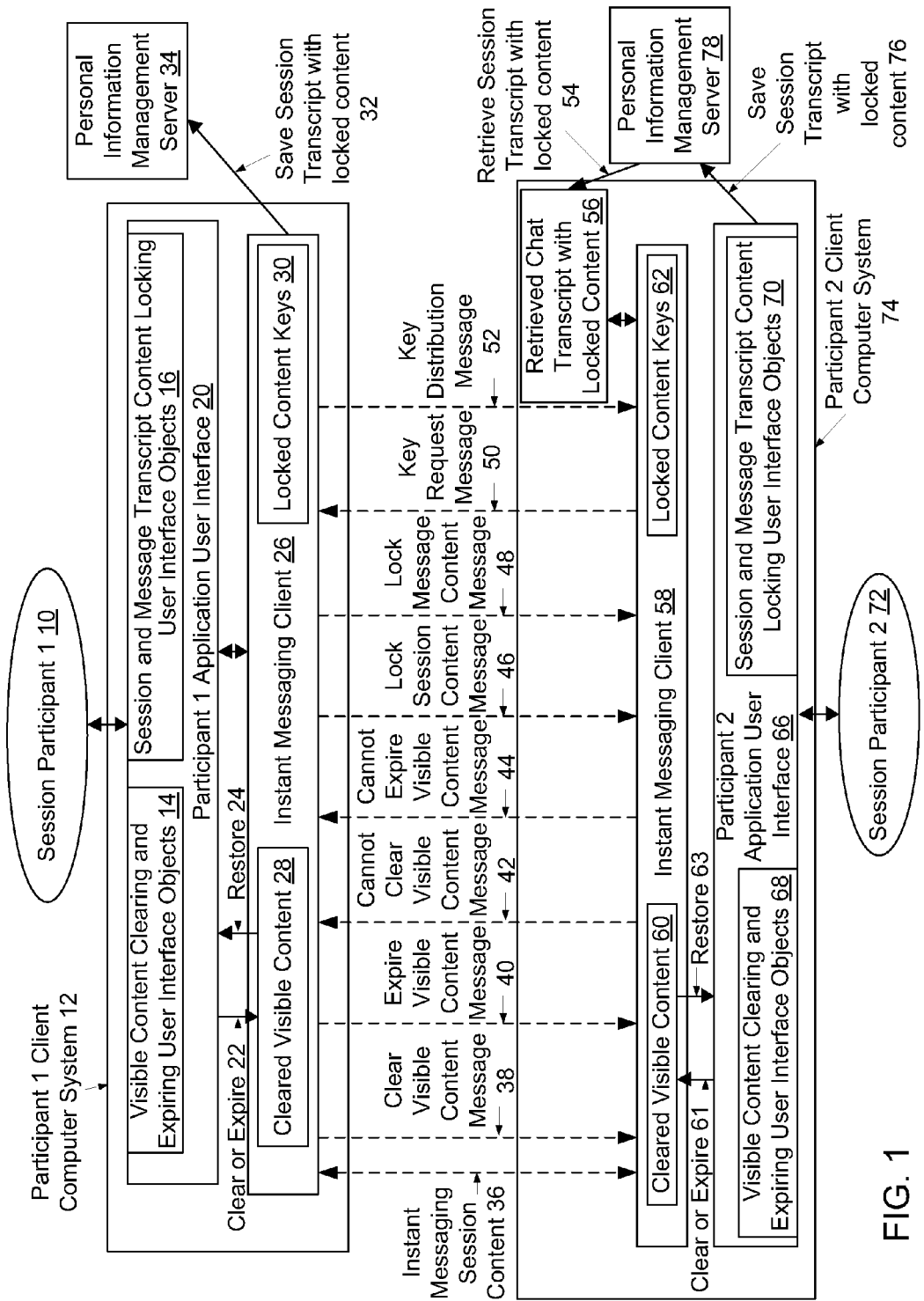
FIG. 1 is a block diagram showing features of an illustrative embodiment of the disclosed system.

FIG. 1 is a block diagram showing features of an illustrative embodiment of the disclosed system. As shown in FIG. 1, Session Participant 1 10 uses Participant 1 Client Computer System 12 to participate in one or more instant messaging sessions with one or more other participants, shown for purposes of illustration in FIG. 1 as Session Participant 2 72. Session Participant 2 72 participates in such instant messaging sessions through use of Participant 2 Client Computer System 74. While for purposes of concise illustration only two instant messaging session participants and associated client computer systems are shown in FIG. 1, it should be recognized that the present invention is applicable to instant messaging sessions and underlying systems to support such sessions involving any specific number of participants and associated client computer systems. Moreover, while FIG. 1 shows client computer systems and associated program code through which such instant messaging session are provided to the session participants, it should further be understood that one or more server computer systems may also be used in combination with such client computer systems to provide the instant messaging sessions of the disclosed system.

As further shown in FIG. 1, the Participant 1 Client Computer System 12 provides Session Participant 1 10 with Participant 1 Application User Interface 20 generated by Instant Messaging Client application program code 26. Participant 1 Application User Interface 20 is, for example, at least part of a graphical user interface provided to Session Participant 1 10 through a visual display device of the Participant 1 Client Computer System 12. The Participant 1 Application User Interface 20 includes Visible Content Clearing and Expiring User Interface Objects 14, and Session and Message Transcript Content Locking User Interface Objects 16. Visible Content Clearing and Expiring User Interface Objects 14 include one or more graphical display objects enabling Participant 1 10 to temporarily clear or expire visible content currently displayed in a live session display area of an instant messaging session application user interface displayed to participants in a current instant messaging session. Visible Content Clearing and Expiring User Interface Objects 14 further include one or more graphical display objects that enable Participant 1 10 to restore such temporarily cleared visible content to the live session display area of the Application User Interface 20.

In the illustrative embodiment of FIG. 1, Instant Messaging Client 26 stores Cleared Visible Content 28 removed from the live session display area provided to Session Participant 1 10, as a result of a Clear Visible Content or Expire Visible Content command 28. The Cleared Visible Content 28 can be restored to the live session display area of the Participant 1 Application User Interface 20 through a Restore Visible Content command 24.

The Instant Messaging Client 26 further includes a number of Locked Content Keys 30 that relate to locking and/or unlocking of instant messaging session contents stored (or "logged") as part of a session transcript into a log file, for example at the end of an instant messaging session, as shown by the Save Session Transcript with Locked Content operation 32 in FIG. 1. While for purposes of illustration the operation 32 is shown saving the session transcript of a instant messaging session to a log file maintained in a Personal Information Management Server 34, such an operation to save a session transcript may be performed into a log file contained in any specific file system or file repository accessible to and/or contained within the Participant 1 Client Computer System 12. The session transcript saved to the log file during the operation 32 is, for example, a complete set of content provided by all participants of an instant messaging session, from the initiation of the session until its termination. The saved session transcript is saved within the log file in a format that allows a user with sufficient privileges to subsequently open the log file access the instant messaging session transcript after the session has been terminated, for example through an instant messaging client program such as the Instant Messaging Client 26, and/or through another specific session transcript viewing application program, such as a rich text viewer or the like.

As described in more detail below, a session transcript saved by the Instant Messaging Client 26 in the operation 32 may partly or completely include "locked" content that cannot be accessed from the log file without one or more keys required to unlock the locked content. In one embodiment, locked content in a session transcript stored within a log file is encrypted using an encryption key, and a corresponding decryption key is required to unlock it. Any specific type of encryption technology may be used in this regard, including but not limited to public key encryption technology or the like.

The locking of content in an instant messaging session transcript saved into a log file by the Instant Messaging Client 26 may, for example, be performed by the Instant Messaging Client 26 using an encryption key from within the Locked Content Keys 30. Similarly, in order to unlock locked content within a session transcript stored in a log file, an appropriate decryption key within the Locked Content Keys 30 may be required and used by the Instant Messaging Client 26 or other transcript viewing application program.

As also shown in FIG. 1, the Participant 2 Client Computer System 74 provides Session Participant 2 72 with a Participant 2 Application User Interface 66 generated by Instant Messaging Client application program code 58. Participant 2 Application User Interface 66 may similarly be at least part of a graphical user interface provided to Session Participant 2 72 through a visual display device of the Participant 2 Client Computer System 74. Participant 2 Application User Interface 66 includes Visible Content Clearing and Expiring User Interface Objects 68 and Session and Message Transcript Content Locking User Interface Objects 70. Visible Content Clearing and Expiring User Interface Objects 68 include one or more graphical display objects enabling Participant 2 72 to temporarily clear or expire visible content currently displayed in the live session display areas of instant messaging session application user interfaces displayed to participants in a current instant messaging session. Visible Content Clearing and Expiring User Interface Objects 68 further include one or more graphical display objects enabling Participant 2 72 to restore such temporarily cleared visible content into the live session display area of the instant messaging session Application User Interface 66.

Instant Messaging Client 58 is also shown storing Cleared Visible Content 60 resulting from a Clear Visible Content or Expire Visible Content command 61, that can be restored to a live session display area of the Participant 1 Application User Interface 66 through a Restore Visible Content command 63.

The Instant Messaging Client 58 includes a number of Locked Content Keys 62 for locking and/or unlocking of contents in instant messaging session transcripts stored (or "logged") into log files, for example at the end of an instant messaging session, as shown by the Save Session Transcript with Locked Content operation 76. As noted above, while for purposes of illustration the operation 76 is shown saving the contents of an instant messaging session to a session transcript in a log file contained in a Personal Information Management Server 78, such an operation to save a session transcript of an instant messaging session into a log file may be performed into a log file contained in any specific file system or repository accessible to and/or contained within the Participant 2 Client Computer System 74. A session transcript saved to a log file during the operation 76 is, for example, a complete set of instant messaging session content provided by all participants in an instant messaging session, from the initiation of the session until its termination. The session transcript is saved to the log file in a format allowing a participant or other user to subsequently open the log file and view the instant messaging session transcript contents after the instant messaging session has been terminated, for example using an instant messaging client program such as the Instant Messaging Client 58, and/or another specific type of viewing application program, e.g. a rich text viewer program or the like.

The instant messaging session transcript saved into a log file by the Instant Messaging Client 58 in the operation 76 may partly or completely include "locked" content that cannot be accessed without possession of one or more keys required to unlock the locked content. As noted above, in one embodiment, such locked content within an instant messaging session transcript stored in a log file may be encrypted using an encryption key when it is locked, and a corresponding decryption key is required to unlock it by decrypting the locked content. Locking of content in the instant messaging session transcript saved into a log file by the Instant Messaging Client 58 may, for example, be performed by the Instant Messaging Client 26 using an encryption key within the Locked Content Keys 30. Similarly, in order to unlock any locked content within a retrieved instant messaging session transcript file, an appropriate decryption key or keys within the Locked Content Keys 30 may be required.

For example, an operation 54 retrieves the contents of a log file storing a previously saved instant messaging session transcript, shown in FIG. 1 by Retrieved Chat Transcript with Locked Content 56. In an embodiment in which locked content is encrypted, the Retrieved Chat Transcript with Locked Content 56 includes instant messaging session content that has been locked using one or more encryption keys conveyed to the Locked Content Keys 62 during operation of the disclosed system. In order for Session Participant 2 72 to view such locked content in the Retrieved Chat Transcript with Locked Content 56, the appropriate decryption key or keys must be conveyed to the Locked Content Keys 62 and used to unlock the locked content, e.g. by decrypting the locked content.

In an example of operation of the illustrative embodiment shown in FIG. 1, Instant Messaging Content 36 (e.g. text, video, sound clips, files, etc.) is exchanged between Session Participant 1 10 and Session Participant 2 72 during an instant messaging session provided to the participants by the respective instant messaging application clients 26 and 58. In response to Session Participant 1 10 issuing a clear visible content command, a Clear Visible Content Message 38 is sent from Instant Messaging Client 26 to Instant Messaging Client 58. In a first embodiment, the Instant Messaging Client 58 then provides a prompt in the Visible Content Clearing and Expiring User Interface Objects 68 indicating that Session Participant 1 10 has issued a clear visible content command, and requesting that Session Participant 2 72 approve or deny the command. In the event that Session Participant 2 72 approves the clear visible content command, then the live session display area within the Participant 2 Application User Interface 66 is temporarily cleared of its current visible content, which is stored for potential future restoration in Cleared Visible Content 60. Otherwise, if Session Participant 2 72 denies the clear visible content command, then the live session display area is not cleared, and a Cannot Clear Visible Content Message 42 is sent to the Instant Messaging Client 26 so that an display object (e.g. pop up window, dialog box or the like) can be provided to Session Participant 1 10 in the Visible Content Clearing and Expiring User Interface Objects 14 indicating that the live session display area of Session Participant 2 72 could not be cleared. The Cannot Clear Visible Content Message 42 may also be provided in response to a determination that the Instant Messaging Client 58 does not support live session display area visible content clearing. In an alternative embodiment, no prompt or other indication is provided to Session Participant 2 72 in response to the Clear Visible Content Message 38, and the visible contents of the live session display area is immediately cleared and stored in the Cleared Visible Content 60 for potential future restoration.

As further shown in FIG. 1, an example of system operation includes an Expire Visible Content Message 40 being sent from the Instant Messaging Client 26 to the Instant Messaging Client 58 in response to an expire visible content command being issued by Session Participant 1 10. In a first embodiment, the Instant Messaging Client 58 provides a prompt (e.g. pop up window, dialog box, or the like) in the Visible Content Clearing and Expiring User Interface Objects 68 indicating that Session Participant 1 10 has issued an expire visible content command, and requesting that Session Participant 2 72 approve or deny the command. In the event that Session Participant 2 72 approves the expire visible content command, then the live session display area within the Participant 2 Application User Interface 66 is temporarily cleared of its currently visible content upon satisfaction of an associated criteria (e.g. a time period expires), and the expired visible content is stored for potential future restoration in the Cleared Visible Content 60. Otherwise, if Session Participant 2 72 denies the clear visible content command, then her live session display area is not cleared, and a Cannot Clear Visible Content Message 44 is sent to the Instant Messaging Client 26 so that an indication (e.g. pop up window or the like) can be provided to Session Participant 1 10 in the Visible Content Clearing and Expiring User Interface Objects 14 that the live session display area of Session Participant 2 72 could not be expired. The Cannot Expire Visible Content Message 44 may also be provided in response to a determination that the Instant Messaging Client 58 does not support live session display area visible content expiration. In an alternative embodiment, no prompt or other indication is provided to Session Participant 2 72 in response to the Expire Visible Content Message 38, and the contents of the live session display area are cleared and stored in the Cleared Visible Content 60 for potential future restoration upon satisfaction of the expiration criteria.

Operation of the embodiment shown in FIG. 1 may further include sending of a Lock Session Content Message 46 from the Instant Messaging Client 26 to the Instant Messaging Client 58 in response to the Session Participant 1 10 issuing a lock session content command through the Session and Message Transcript Content Locking User Interface Objects 16. The Lock Session Content Message 46 may, for example, include an encryption key that is to be used to encrypt the complete contents of an instant messaging session when that instant messaging session contents is saved 76 by Session Participant 2 72 in a session transcript to a log file, e.g. by one of the participants upon termination of the session. Similarly, a Lock Message Content Message 46 may be sent from the Instant Messaging Client 26 to the Instant Messaging Client 58 in response to the Session Participant 1 10 issuing a lock message content command through the Session and Message Transcript Content Locking User Interface Objects 16. The Lock Message Content Message 46 may, for example, include an encryption key that is to be used to encrypt an associated line or message within the instant messaging session contents when the instant messaging session contents is saved 76 by Session Participant 2 72 into a session transcript in a log file, e.g. upon termination of the session. Such encryption keys provided in the Lock messages 46 and 48 may, for example, be stored in the Locked Content Keys 62.

Operation of the embodiment of FIG. 1 may further include sending of a Key Request Message 50 from the Instant Messaging Client 58 to the Instant Messaging Client 26 in response to Session Participant 2 72 issuing a key request through Session and Message Transcript Content Locking User Interface Objects 70, in order to unlock some or all of the locked content in the Retrieved Chat Transcript with Locked Content 56. Session Participant 1 10 can then allow or disallow (e.g. through a dialog box or the like) sending of a decryption key in a Lock Distribution Message 52 sent from Instant Messaging Client 26 to Instant Messaging Client 58. In the event such a decryption key is sent, it may be stored in the Locked Content Keys 62, and used by the Instant Messaging Client 58 to unlock locked content in the Retrieved Chat Transcript with Locked Content 56 so that such unlocked content can be viewed by the Session Participant 2 72.

The client computer systems 12 and 74 of FIG. 1 are communicably connected, for example by way of a communication network such as the Internet, a Local Area Network (LAN), or other specific type of communication network. The client software 26 and 58 may, for example, use a client-server approach to operating with server application software executing on one or more server computer systems to provide portions of the application user interfaces 20 and 66. Alternatively, client software 26 and 58 may include Web browser program functionality operable to request and receive Web page content, including HTML (Hypertext Markup Language) code or the like, and to render such Web page content in their respective user interfaces.

The client computer systems 12 and 74 may each include at least one processor, program storage, such as memory, for storing program code executable on the processor, and one or more input/output devices and/or interfaces, such as data communication and/or peripheral devices and/or interfaces. The client computer systems 12 and 74 may each further include appropriate operating system software.

Figure 2:
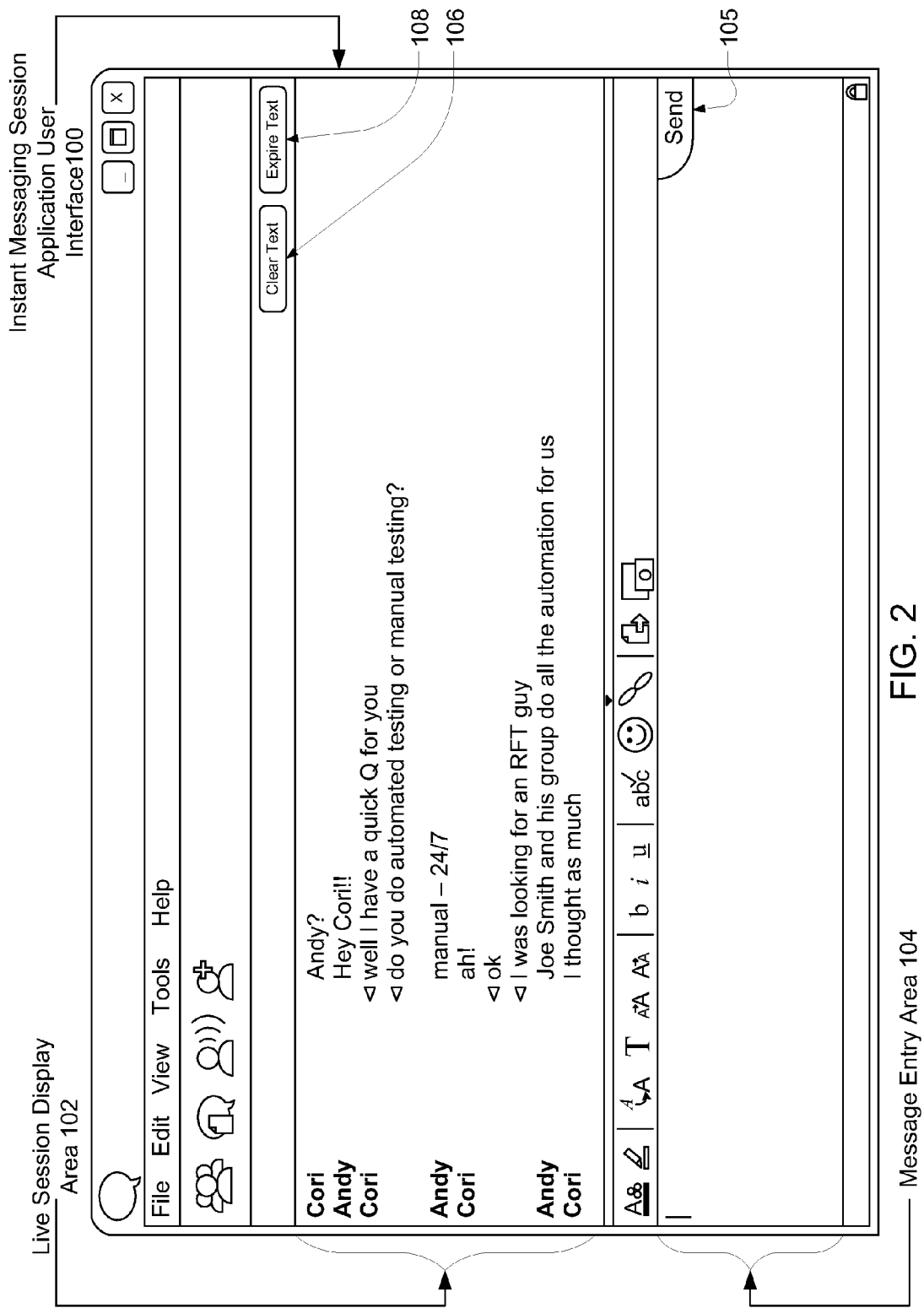
FIG. 2 is a simplified screen shot showing an example of an instant messaging session application user interface in an illustrative embodiment, including a live session display area.

FIG. 2 is a simplified screen shot showing an example of an Instant Messaging Session Application User Interface 100. The Instant Messaging Session User Interface 100 is an example of the Participant Application User Interfaces 20 and 66 shown in FIG. 1. As shown in FIG. 2, the Instant Messaging Session Application User Interface 100 includes a Live Session Display Area 102 and a Message Entry Area 104. During an instant messaging session, content entered by session participants is displayed in the Live Session Display Area 102. A session participant can add new content to the session being displayed in the Live Session Display Area 102 by first entering (e.g. typing) content into the Message Entry Area 104, and then clicking on the Send button 105.

The Instant Messaging Session Application User Interface 100 is shown also including a Clear Text button 106, and an Expire Text button 108. The Clear Text button 106 and Expire Text button 108 are examples of the Visible Content Clearing and Expiring User Interface Objects 14 and 68 shown in FIG. 1. When a session participant clicks on the Clear Text button 106, the disclosed system operates to cause the visible contents of the Live Session Display Area 102 to be temporarily cleared for both the session participant that clicked on the Clear Text button 106, and also for all other session participants. For example, if the Session Participant 1 10 in FIG. 1 clicked on the Clear Text button 106, then the Live Session Display Area 102 would be temporarily cleared in both the Participant 1 Application User Interface 20 and the Participant 2 Application User Interface 66, in the case where both Session Participant 1 10 and Session Participant 2 72 were participants in the instant messaging session being presented in the Live Session Display Area 102.

When a session participant clicks on the Expire Text button 108, the disclosed system operates to cause the visible contents of the Live Session Display Area 102 to be temporarily cleared for both the session participant that clicked on the Expire Text button 108, and also for all other session participants, upon satisfaction of a specified criteria (e.g. expiration of a specified time period). For example, if the Session Participant 1 10 in FIG. 1 clicked on the Expire Text button 108, then the Live Session Display Area 102 would be temporarily cleared in both the Participant 1 Application User Interface 20 and the Participant 2 Application User Interface 66 upon satisfaction of a criteria specified by Session Participant 1 10, in the case where both Session Participant 1 10 and Session Participant 2 72 were participants in the instant messaging session being presented in the Live Session Display Area 102.

Figure 3:
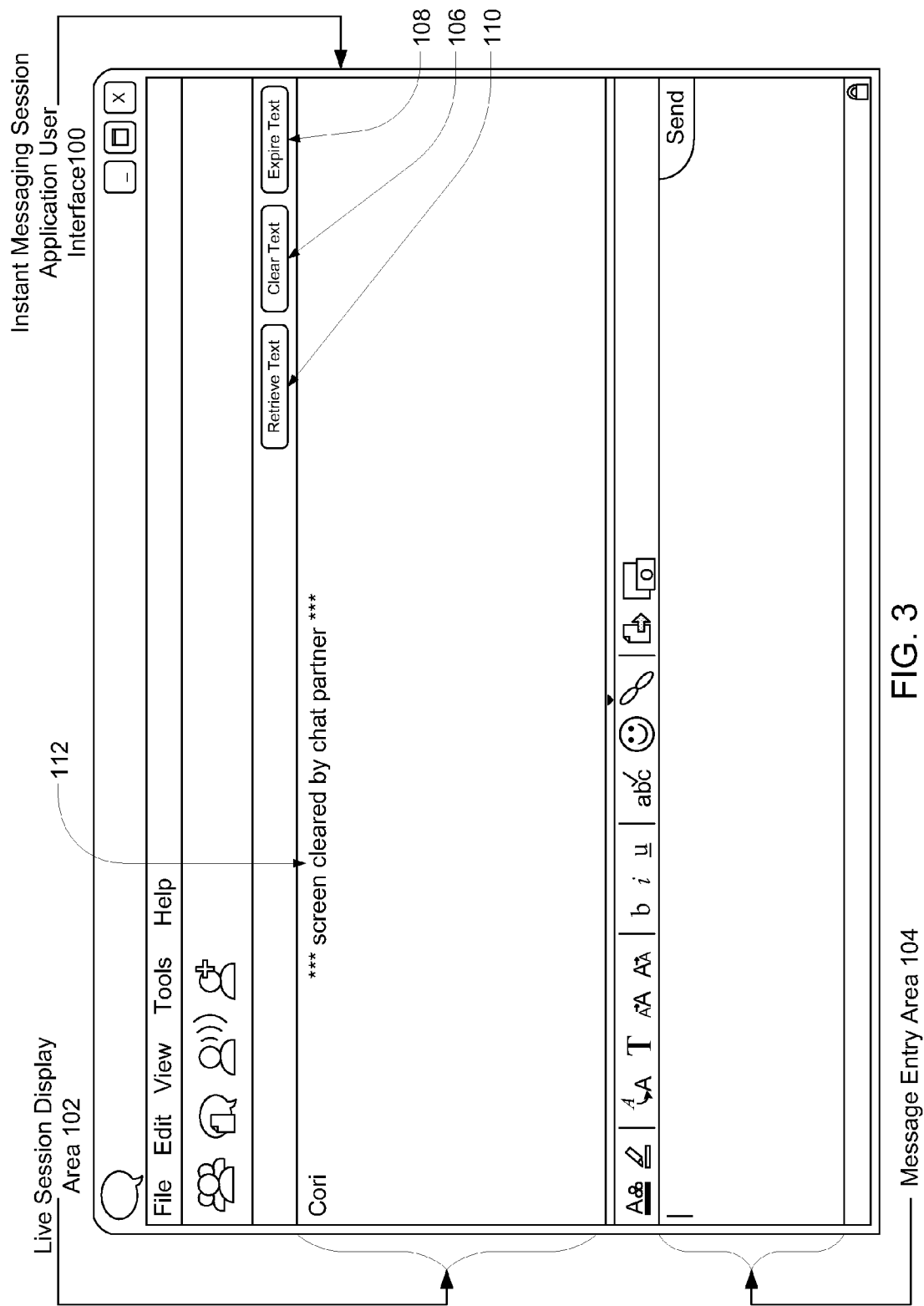
FIG. 3 is a simplified screen shot showing the instant messaging session application user interface after the currently contents of the live session display area have been cleared either as a result of a clear visible content or expire visible content command.

FIG. 3 is a simplified screen shot showing the Instant Messaging Session Application User Interface 100 after the visible contents of the live session display area have been temporarily cleared, either as a result of a clear visible content or expire visible content command. For example, during an instant messaging session between a first participant "Cori" and a second participant "Andy", if "Cori" were to click on the Clear Text button 106, then the disclosed system would cause the Instant Messaging Session Application User Interface 100 to appear as it is shown in FIG. 3, having the Live Session Display Area 102 temporarily cleared of visible content, and in one embodiment providing a message 112 indicating that the content of the Live Session Display Area 102 has been cleared by the participant "Cori". Also as a result of the content of the Live Session Display Area 102 being cleared, a Retrieve Text button 110 is presented in the Instant Messaging Session Application User Interface 100 to enable each participant to recall the visible content that was previously cleared from the Live Session Display Area 102, by clicking on the Retrieve Text button 110. The Retrieve Text button 110 is another example of the Visible Content Clearing and Expiring User Interface Objects 14 and 68 shown in FIG. 1.

Figure 4:
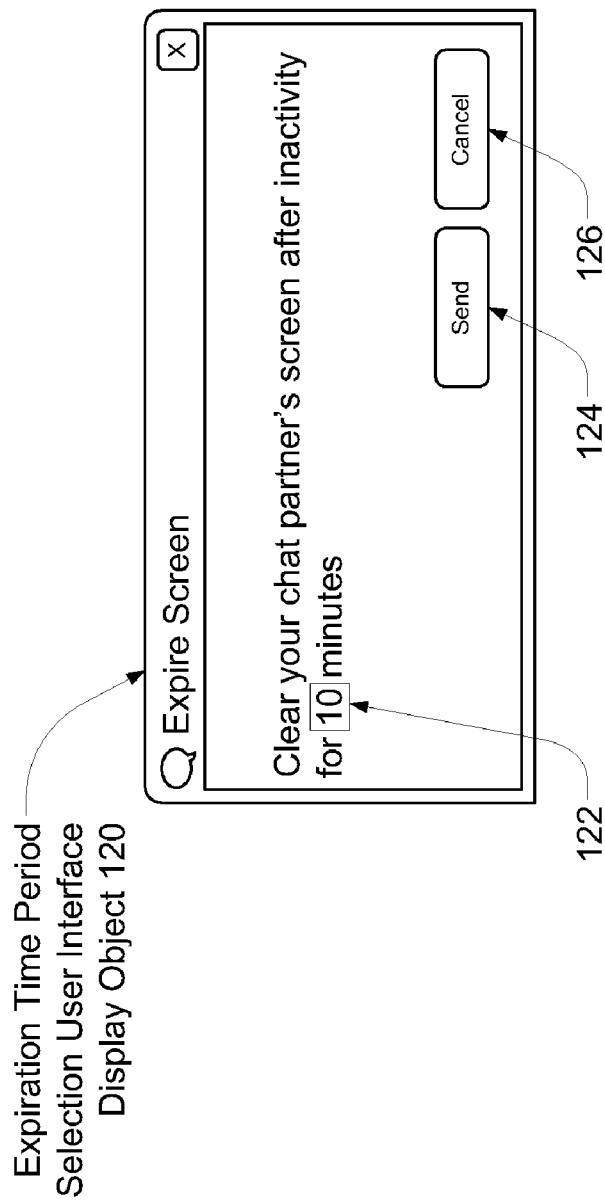
FIG. 4 is a simplified screen shot showing an example of an expiration time period selection user interface display object in an illustrative embodiment.

FIG. 4 is a simplified screen shot showing an example of an Expiration Time Period Selection User Interface display object 120 in an illustrative embodiment. The Expiration Time Period User Interface display object 120 of FIG. 4 is an example of a mechanism used in an embodiment of the disclosed system to determine an expiration criteria that when satisfied, causes the Live Session Display Area 102 of FIG. 2 to be cleared. For example, in one embodiment, when an instant messaging session participant clicks on the Expire Text button 108, the disclosed system causes the Expiration Time Period Selection User Interface Display Object 120 to be displayed to that session participant. The Expiration Time Period Selection User Interface Display Object 120 enables a session participant to select an expiration time, for example through the user selectable time object 122, which provides a set of selectable time periods from which the participant may select. The selected time period is then used such that when the selected time period expires, the contents of the Live Session Display Area 102 is temporarily cleared. In order to select the current value of the user selectable time object 122, the session participant can click on the Send button 124. In order to cancel the operation, the user can click on the Cancel button 126. The Expiration Time Period Selection User Interface Display Object 120 is another example of the Visible Content Clearing and Expiring User Interface Objects 14 and 68 shown in FIG. 1.

Figure 5:
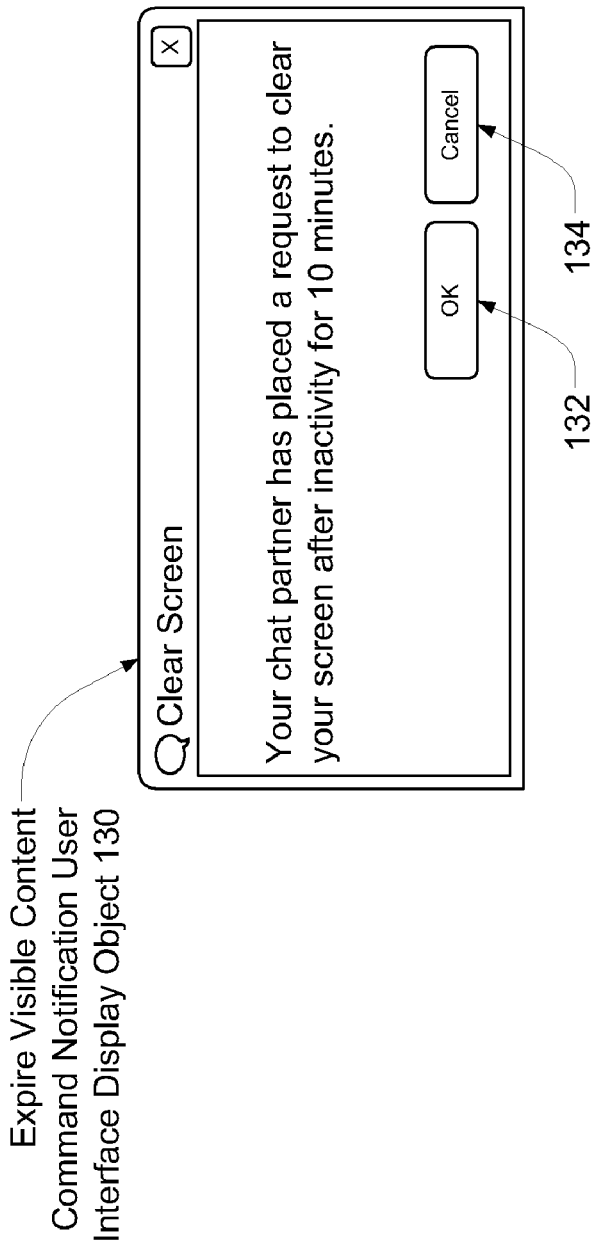
FIG. 5 is a simplified screen shot showing an example of a clear visible content command notification user interface display object in an illustrative embodiment.

FIG. 5 is a simplified screen shot showing an example of an Expire Visible Content Command Notification User Interface Display Object 130 in an illustrative embodiment. The Expire Visible Content Command Notification User Interface Display Object 130 is an example of a display object presented to an instant messaging session participant by the disclosed system in the event that another participant has issued an expire visible content command, for example by clicking on the Expire Text button 108. The Expire Content Command Notification User Interface Display Object 130 enables the session participant to which it is presented to either allow or prevent the clearing of the Live Session Display Area 102 in their instant messaging session application user interface upon expiration of an indicated time period indicated (e.g. 10 minutes). Clearing of the local Live Session Display Area 102 can be prevented by clicking on the Cancel button 134, or allowed by clicking on the OK button 132. If the session participant clicks on the OK button 132, the Live Session Display Area 102 will be temporarily cleared after the indicated time period expires, as shown by the Instant Messaging Session Application User Interface of FIG. 3. The Expire Visible Content Command Notification User Interface Display Object 130 is another example of the Visible Content Clearing and Expiring User Interface Objects 14 and 68 shown in FIG. 1.

Figure 6:
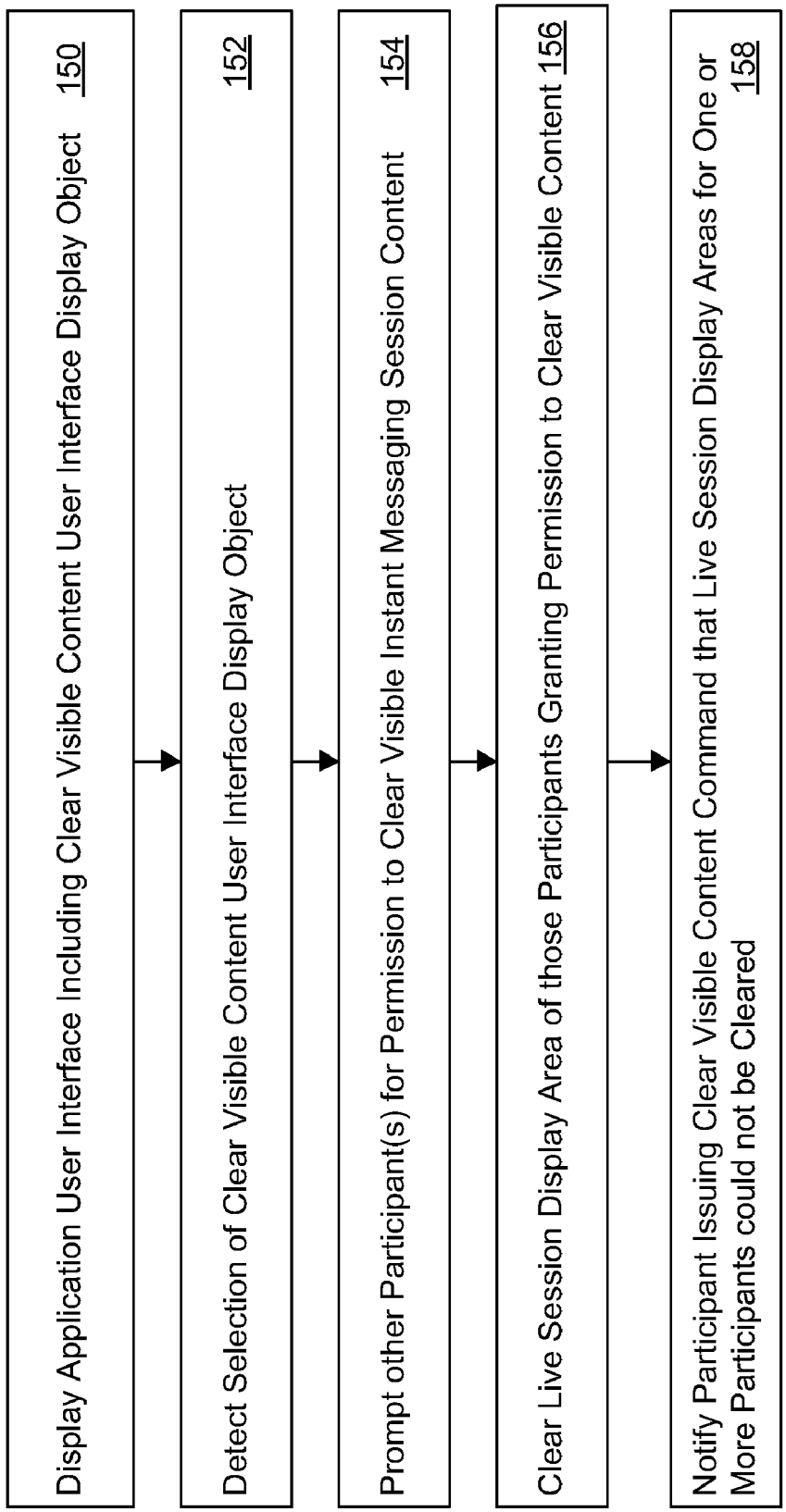
FIG. 6 is a flow chart showing steps performed during processing of a clear visible content command in an illustrative embodiment.

FIG. 6 is a flow chart showing steps performed during processing of a clear visible content command in an illustrative embodiment of the disclosed system. As shown in FIG. 6, at step 150, the disclosed system displays an application user interface including a clear visible content user interface display object. For example, one embodiment of the disclosed system creates the Instant Messaging Session Application User Interface 100 of FIG. 2, including the Clear Text button 106.

At step 152 the disclosed system detects selection of the clear visible content user interface display object, for example by detecting that a session participant has clicked on the Clear Text button 106 of FIG. 2. In one embodiment, the disclosed system operates at step 154 to prompt the other session participant(s) for permission to clear the currently displayed instant messaging session content from their respective live session display areas. For example, the disclosed system may be embodied to generate a display object such as the display object 130 shown in FIG. 5 at step 154, in order to allow session participants to either allow or deny clearing of their local live session display areas in response to a clear content visible command issued by another participant.

At step 156, the disclosed system operates to clear the live session display area of participants that have granted permission for the currently displayed instant messaging session content to be cleared from their live session display areas at step 154. Alternatively, in an embodiment in which no prompting is performed to allow session participants to deny permission for their local live session display areas to be cleared as the result of a clear visible content command, live session display areas for all session participants are cleared at step 156 without any such prompting.

The disclosed system may further be embodied to inform a participant that issues a clear visible content command of the fact that the live session display areas of one or more other participants could not be cleared. For example, in the event that the client application software of another session participant does not support live session display area clearing by way of clear visible content commands, then the identity of that session participant would be presented to the participant issuing the clear content command to notify them that the live session display area of that session participant could not be cleared. Similarly, if a session participant prevented the clearing of their live session display area through an option provided in a display object such as that shown in FIG. 5, then the identity of that session participant would also be provided at step 158 to the session participant issuing the clear content command.

Figure 7:
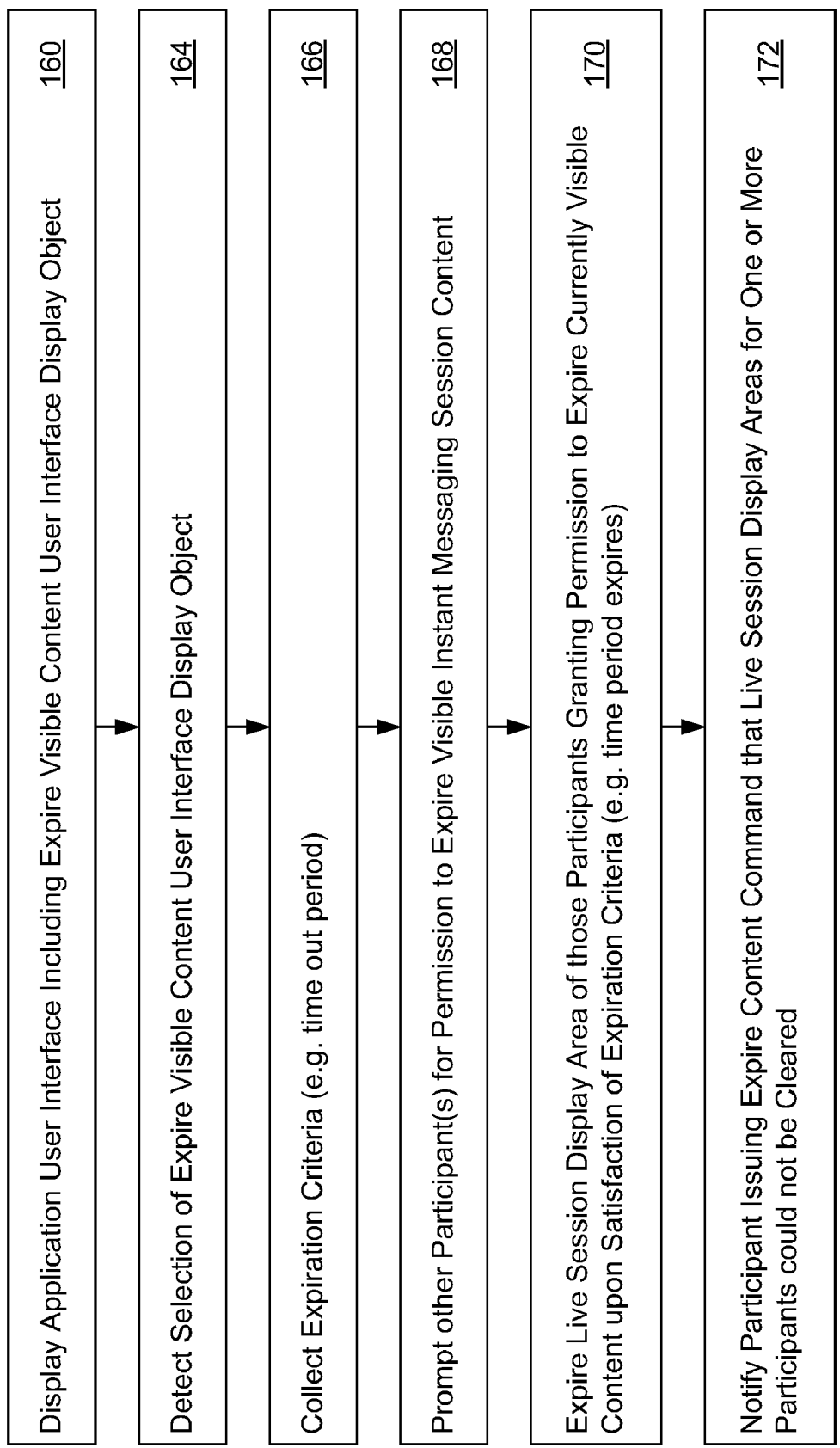
FIG. 7 is a flow chart showing steps performed during processing of an expire visible content command in an illustrative embodiment.

FIG. 7 is a flow chart showing steps performed during an expire visible content operation in an illustrative embodiment. As shown in FIG. 7, at step 160, the disclosed system displays an application user interface including an expire visible content user interface display object. For example, an embodiment of the disclosed system generates the Instant Messaging Session Application User Interface 100 of FIG. 2, including the Expire Text button 108.

At step 162 the disclosed system detects selection of the expire visible content user interface display object, for example by detecting that a session participant has clicked on the Expire Text button 108. In one embodiment, the disclosed system operates at step 164 to prompt the other session participant(s) for permission to expire the currently visible instant messaging session content from their respect live session display areas. For example, the disclosed system may be embodied to generate a display object such as the display object 130 shown in FIG. 5 at step 164, in order to allow session participants to either allow or deny clearing of their local live session display areas in response to an expire visible content command issued by another participant.

At step 166, the disclosed system operates to collect expiration criteria that is to be satisfied before the instant messaging session contents is cleared from the live session display areas of the session participants. For example, at step 166 the disclosed system may operate to determine a time period after which the instant messaging session contents is to be cleared from the live session display areas of session participants, e.g. through a display object such as the Expiration Time Period Selection User Interface Display Object 120 shown in FIG. 4. Other expiration criteria that may alternatively be collected at step 166 include, for example, an inactivity time period or the like, indicating a time period of inactivity for a session participant, after which their live session display area will be cleared by the disclosed system in response to the expire visible content command.

At step 168, the disclosed system may be embodied to generate a prompt, such as the display object shown in FIG. 5, that enables session participants to permit or deny the clearing of their respective live session display areas upon satisfaction of an expiration criteria.

At step 170, the disclosed system clears the live session display areas of participants that have granted permission to expire the currently visible instant messaging session content from their local live session display areas at step 168. Alternatively, in an embodiment in which no prompting is performed to allow session participants to prevent their local live session display areas from being cleared as the result of an expire visible content command, live session display areas for all session participants are cleared at step 170.

The disclosed system may further be embodied to inform a participant that issues an expire visible content command of the fact that the live session display areas of one or more other participants could not be cleared. For example, in the event that the client application software of another session participant does not support live session display area clearing by way of expire visible content commands, then the identity of that session participant would be presented to the participant issuing the expire content command to notify them that the live session display area of that session participant could not be cleared. Similarly, if a session participant prevented the clearing of their live session display area through an option provided in a display object such as that shown in FIG. 5, then the identity of that session participant would also be provided at step 172 to the session participant issuing the expire visible content command.

Figure 8:
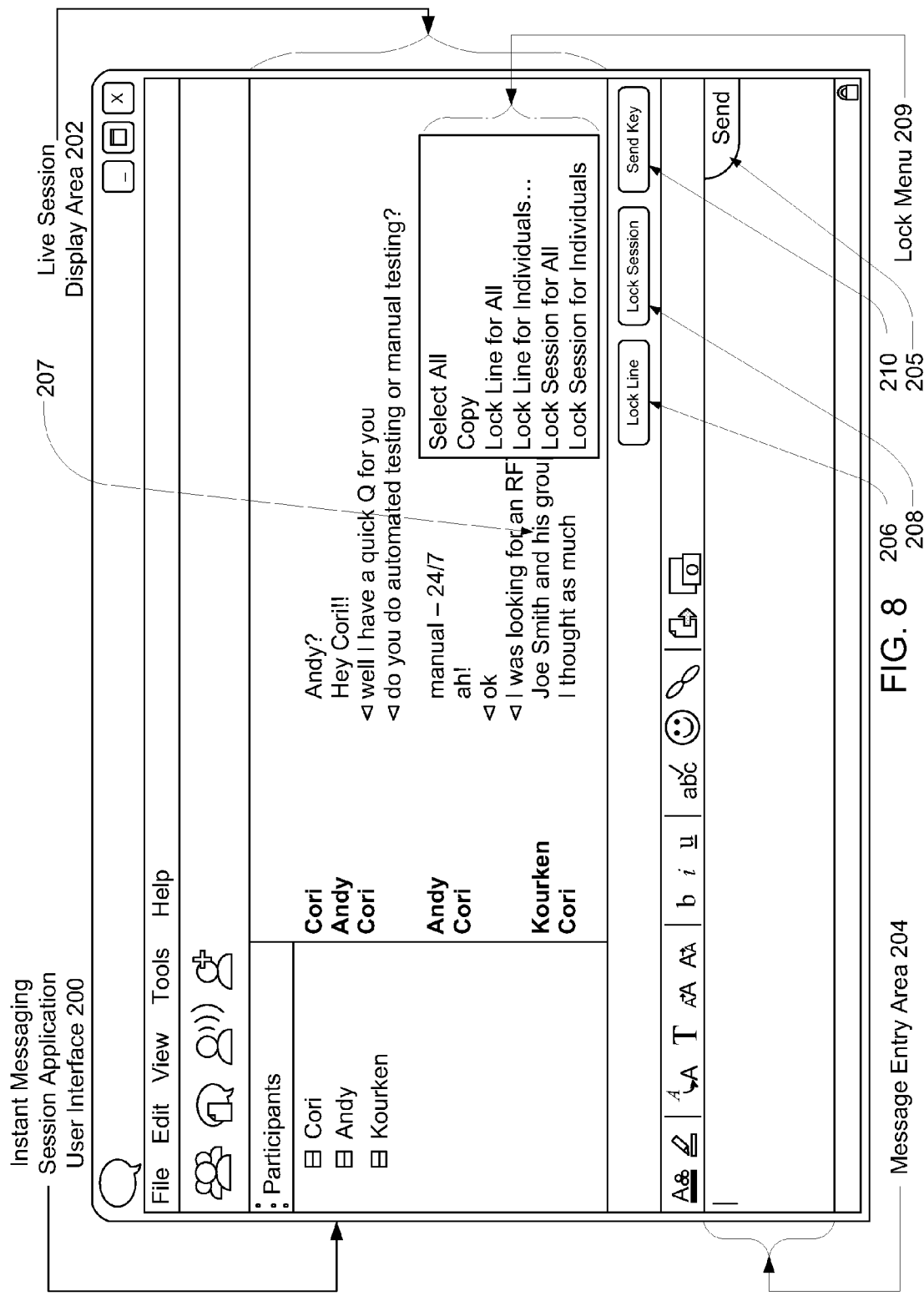
FIG. 8 is a simplified screen shot showing an example of an instant messaging session application user interface in an illustrative embodiment, including a live session display area.

FIG. 8 is a simplified screen shot showing an example of an Instant Messaging Session Application User Interface 200 in an illustrative embodiment of the disclosed system. The Instant Messaging Session Application User Interface 200 is an example of the Application User Interfaces 20 and 66 shown in FIG. 1. During an instant messaging session, content entered by the session participants is displayed in the Live Session Display Area 202. A session participant can add new content to the session being displayed in the Live Session Display Area 202 by first entering (e.g. typing) content into the Message Entry Area 204, and then clicking on the Send button 205.

The Instant Messaging Session Application User Interface 200 is shown also including a Lock Line button 206, a Lock Session button 208, and a Send Key button 210. The Lock Line button 206, a Lock Session button 208, and Send Key button 210 are examples of the Session and Message Transcript Content Locking User Interface Objects 16 and 70 of FIG. 1. When a session participant clicks on the Lock Line button 206, the disclosed system operates to cause the currently selected message in the Live Session Display Area 202 to be locked when that contents of the instant messaging session is saved in a session transcript to a log file. For example, if the Session Participant 1 10 in FIG. 1 were named "Kourken", and they clicked on the Lock Line button 206, then the currently selected line 207 in the Live Session Display Area 202 would be locked when the session contents are later stored in session transcript into a log file, such that the line 207 could not be subsequently viewed in the session transcript stored in the log file without being unlocked using a key provided by the locking participant (e.g. the participant that entered the currently selected line 207, in this case Kourken).

When a session participant clicks on the Lock Session button 208, the disclosed system operates to cause the entire contents entered into the instant messaging session by all participants during the complete session to be locked when the contents of the instant messaging session stored as a session transcript into a log file. For example, if the Session Participant 1 10 (Kourken) in FIG. 1 clicked on the Lock Session button 208, then the complete contents of a current instant messaging session between Session Participant 1 10 and Session Participant 2 72 would be locked when the session contents are later stored in a session transcript into a log file, such that the complete session contents could not be subsequently viewed in the session transcript stored in the log file without being unlocked using a key provided by the locking participant (e.g. the participant that clicked on the Lock Session button 208, in this case Kourken). In one embodiment of the disclosed system, only the participant that initiated the instant messaging session, e.g. the first participant to enter content into the session, is allowed to lock the entire contents of the session in the session transcript saved to the log file using the Lock Session button 208. Alternatively, the present system may be embodied such that any participant can lock the entire contents of the session saved in the session transcript stored in the log file.

A Send Key button 210 enables a locking participant to send a key to each other participant that the locking participant wishes to be able to unlock content they have locked in the session transcript stored in the log file. For example, if Session Participant 1 10 (Kourken) wished to send either a session or message key to Participant 2 72, then Session Participant 1 10 could click on the Send Key button 210 to cause that key to be sent to Session Participant 2 72.

In another embodiment, the disclosed system generates a Lock Menu 209 in response to a participant right clicking on a line of content within the Transcript Display Area 202. The menu options provided within the Lock Menu 209 enable the participant to lock the currently selected line for all participants, lock the currently selected line for individual participants, lock the complete session for all participants, or lock the complete session for individual participants.

Figure 9:
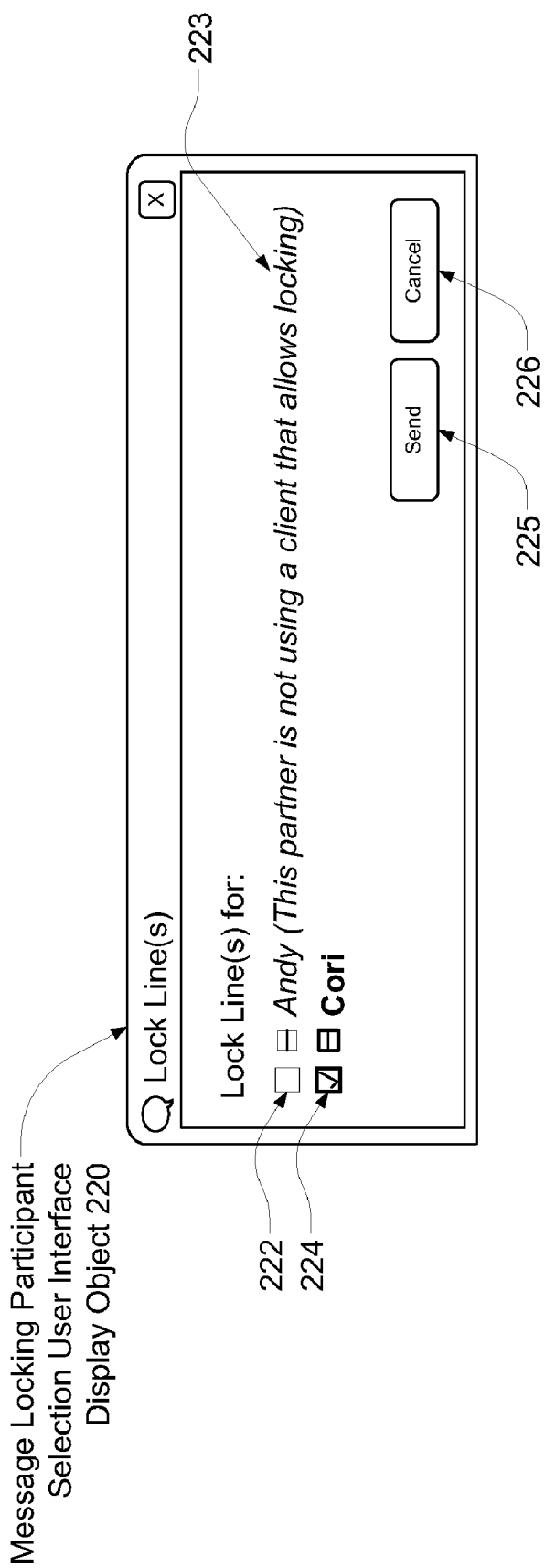
FIG. 9 is a simplified screen shot showing an example of a message locking participant selection user interface display object in an illustrative embodiment.

FIG. 9 is a simplified screen shot showing an example of a Message Locking Participant Selection User Interface Display Object 220 in an illustrative embodiment. The Message Locking Participant Selection User Interface Display Object 220 is an example of the Session and Message Transcript Content Locking User Interface Objects 16 and 70 shown in FIG. 1. The Message Locking Participant Selection User Interface Display Object 220 is generated by an embodiment of the disclosed system in response to a session participant clicking on the Lock Line button 206 shown in FIG. 8. The Message Locking Participant Selection User Interface Display Object 220 enables the locking participant to indicate the other participants for which the currently selected line or message within the Transcript Display Area 202 should be locked when the current session is saved in a session transcript stored in a log file. As shown in FIG. 9, the Message Locking Participant Selection User Interface Display Object 220 includes a number of list items corresponding to other participants in the current session. In the example of FIG. 9, the other participants in the current session are Andy and Cori. The list item 222 corresponds to Andy, and visually indicates (e.g. by its text 223 being italicized) that the instant messaging client software running on Andy's client computer system does not support session transcript content locking for log files. While italicized text is used in the example of FIG. 9 to show that the participant Andy is using a client system that does not have the capability to lock session transcript content in log files, any other specific type of visual indication, e.g. graying out, etc., may be used in the alternative.

Accordingly, because Andy is using a client system that does not have the capability to lock session transcript content in log files, the list item 222 does not allow Andy to be selected as one of the participants for which the currently selected line is to be locked in the session transcript stored in the log file for the current instant messaging session. A list item 224 corresponds to the participant Cori, and includes a check box that can be clicked on to cause Cori to be one of the participants for which the currently selected line is to be locked in the session transcript saved to a log file for the current instant messaging session. The locking participant can then click on the Send button 225 to complete the lock command, or click on the Cancel button 226 to cancel the lock command.

Figure 10:
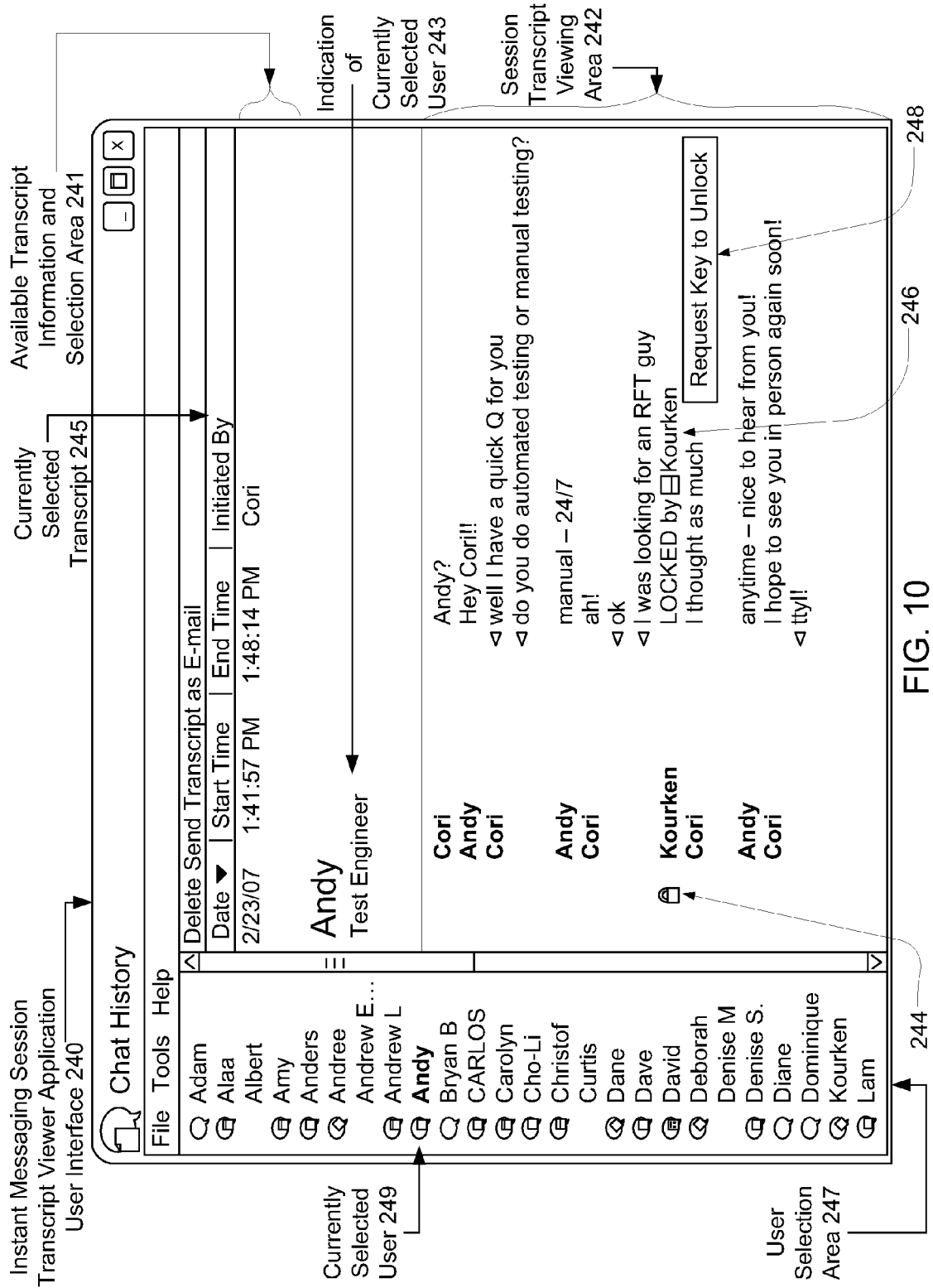
FIG. 10 is a simplified screen shot showing an example of an instant messaging session transcript log file viewer application user interface in an illustrative embodiment, including a transcript display area, and including locked content in the transcript display area for which a key is requested.

FIG. 10 is a simplified screen shot showing an example of an Instant Messaging Session Transcript Log File Viewer Application User Interface 240 in an illustrative embodiment. The Instant Messaging Session Transcript Log File Viewer Application User Interface 240 is a user interface provided by an application that is capable of reading the contents of log files storing saved session transcripts. The Instant Messaging Session Transcript Log File Viewer Application User Interface 240 of FIG. 10 is shown including an example of locked content (e.g. a locked line) for which a key is requested. The Instant Messaging Session Transcript Log File Viewer Application User Interface 240 may, for example be generated by an instant messaging application client program, a rich text viewer, or the like that is capable of presenting the contents of a session transcript saved into a log file.

The Instant Messaging Session Transcript Log Viewer Application User Interface 240 includes a Session Transcript Viewing Area 242, in which contents of the instant messaging session transcript saved into the log file being read is displayed. In the example of FIG. 10, an indicator 244 provides visual indication that a line within the saved instant messaging session transcript in the log file has been locked. While a lock icon is used for this purpose in the example of FIG. 10, any appropriate visual indicator may be used in the alternative. An indication 246 is also provided of the locking participant, in this case Kourken. In order for the local user to access the contents of the locked line of content, a key must be obtained from Kourken. In order to obtain the key, in the embodiment of FIG. 10, the user is provided a key request option 248, for example in response to the user clicking or right clicking on the indication 246. If the user selects the key request option 248, for example by clicking on it, then a key request message is sent to the locking participant.

Figure 11:
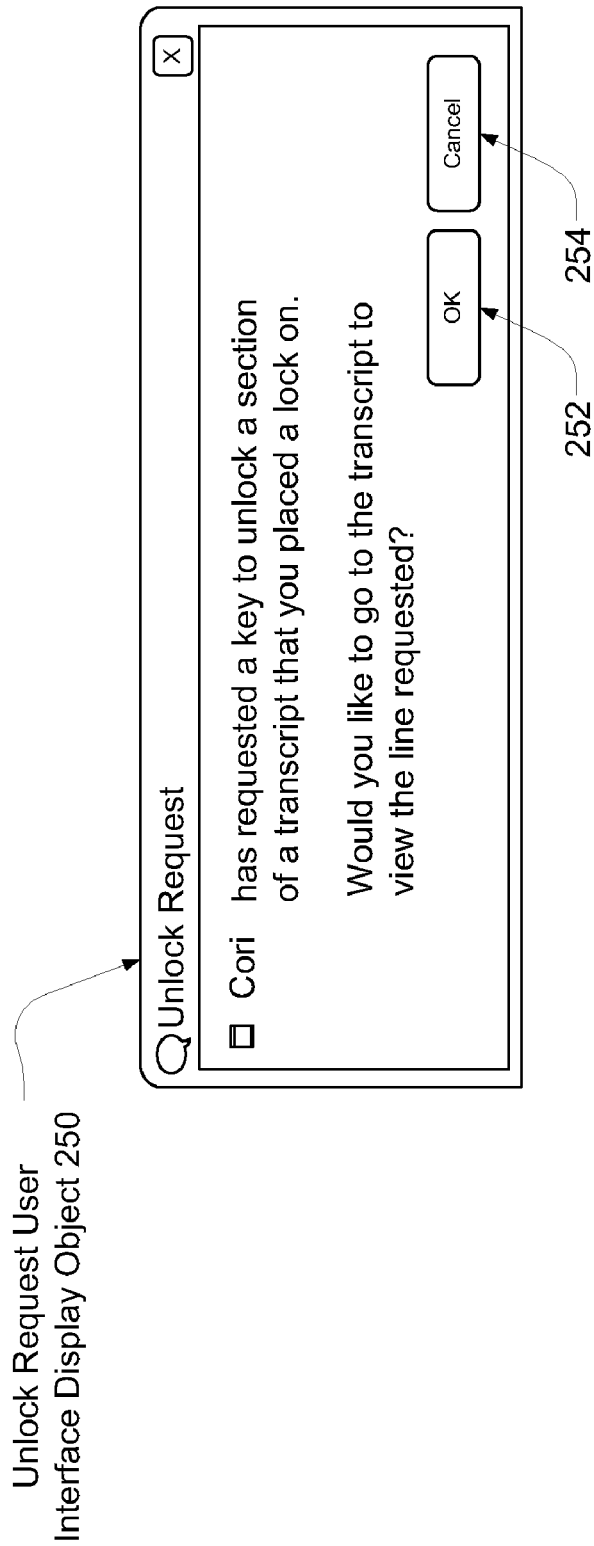
FIG. 11 is a simplified screen shot showing an example of an unlock request user interface display object in an illustrative embodiment.
Figure 12:
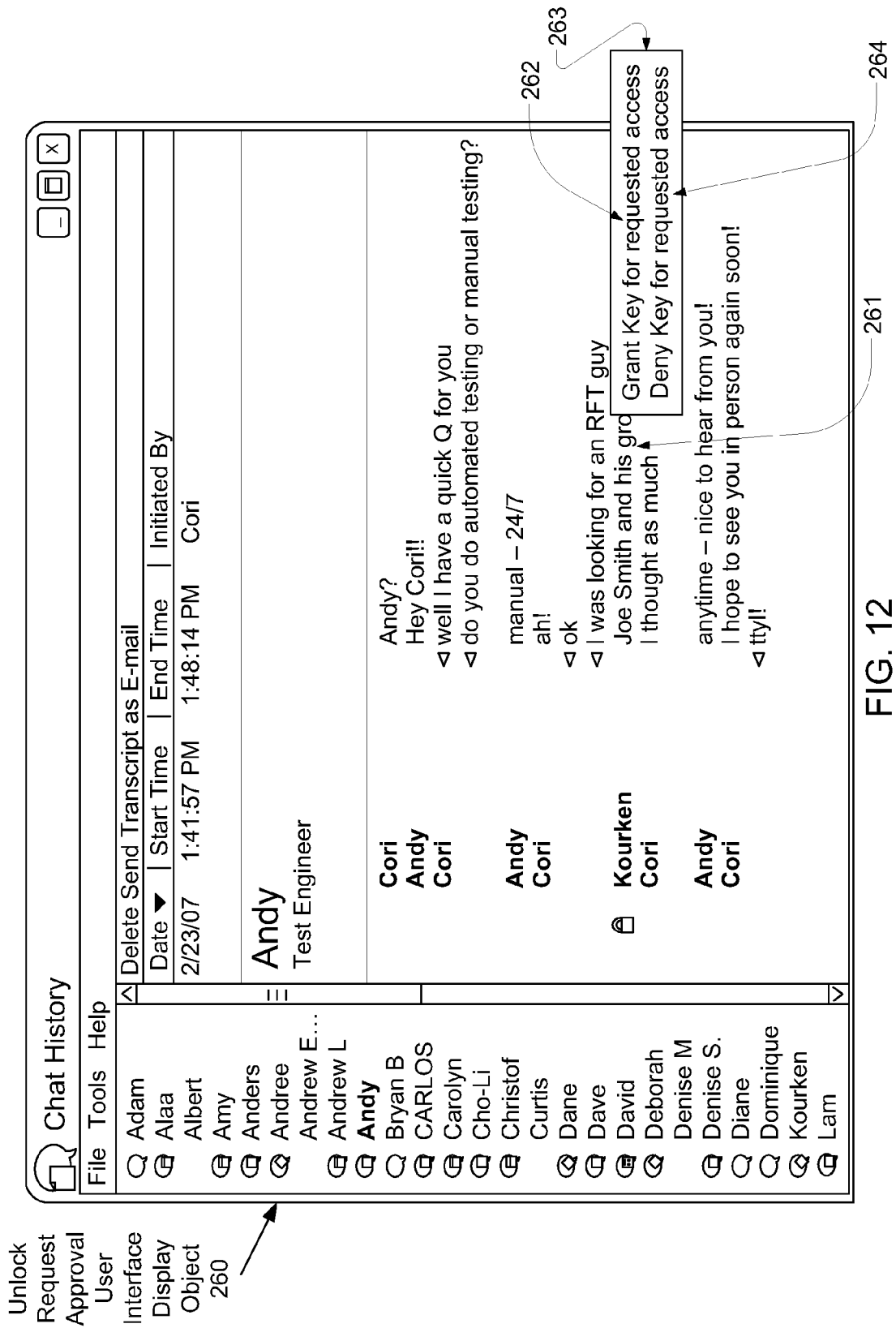
FIG. 12 is a simplified screen shot showing an example of an unlock request approval user interface display object in an illustrative embodiment.

FIG. 11 is a simplified screen shot showing an example of an Unlock Request User Interface Display Object 250 generated in an illustrative embodiment to a locking participant from whom a key has been requested. For example, if Cori were the local user that selected the key request option 248 in FIG. 10, the locking participant (Kourken) would be presented with Unlock Request User Interface Display Object 250. The Unlock Request User Interface Display Object 250 enables the locking participant, in this case Kourken, to either approve or deny the request for the key to unlock the locked content (e.g. a locked line within the session transcript saved in the log file). In the example of FIG. 12, an OK button 252 enables the locking participant to go to a local copy of the session transcript and view a specific locked line for which the key was requested. Otherwise, the locking participant can deny the request by clicking on the Cancel button 254.

FIG. 12 is a simplified screen shot showing an example of an Unlock Request Approval User Interface Display Object 260 in an illustrative embodiment. The Unlock Request Approval User Interface Display Object 260 is displayed to the locking user in response to the user clicking on the OK button 252 shown in FIG. 11. The Unlock Request Approval User Interface Display Object 260 allows the locking participant to see the line of content 261 for which the key was requested. The locking menu 263 in the Unlock Request Approval User Interface Display Object 260 enables the locking participant to choose an option 262 granting the key to the requesting user that can be used to unlock the line of locked content, or to deny the key request by choosing the option 264.

Figure 13:
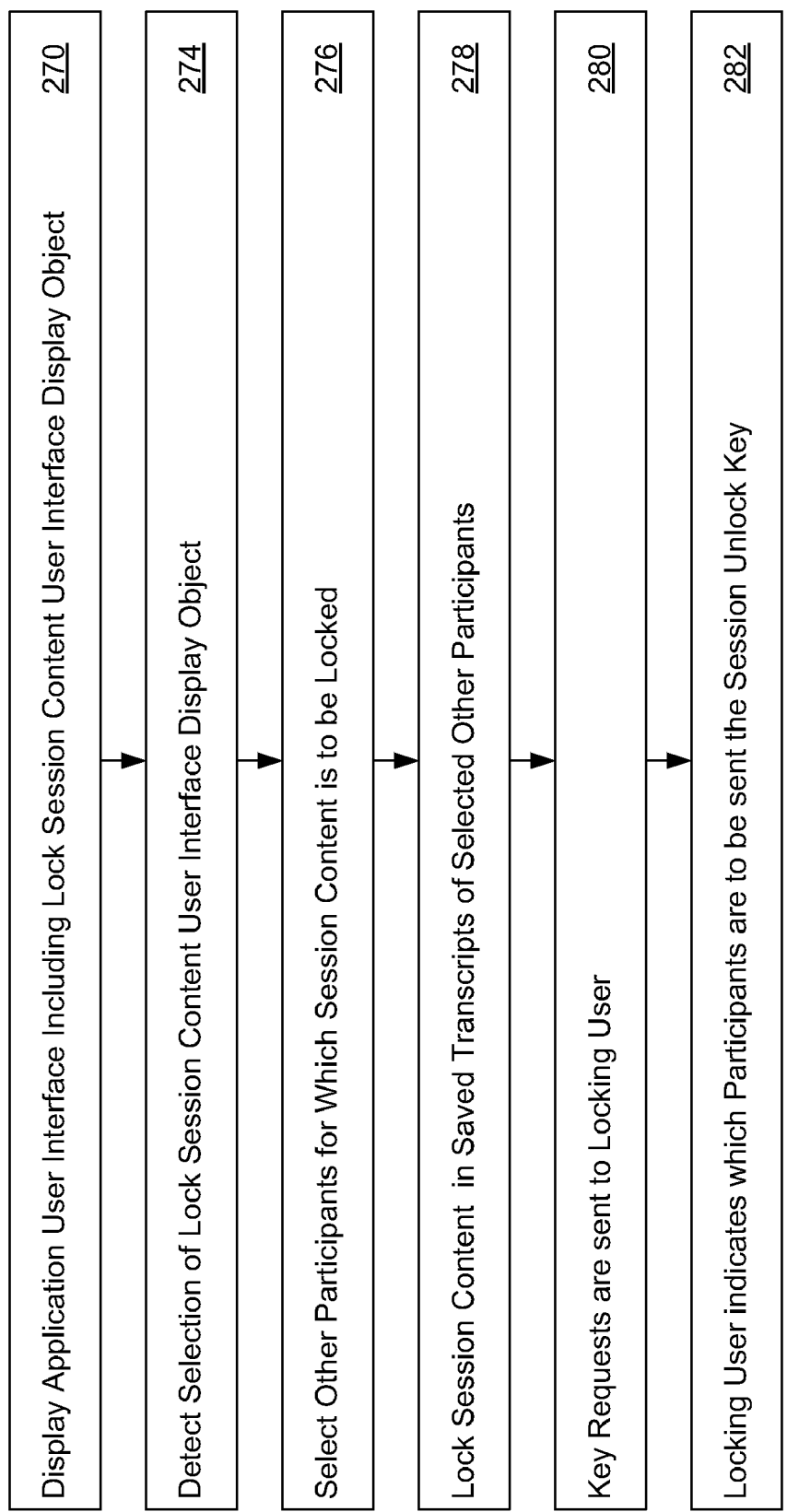
FIG. 13 is a flow chart showing steps performed to process a lock session command in an illustrative embodiment.

FIG. 13 is a flow chart showing steps performed to process a lock session command in an illustrative embodiment. At step 270, the disclosed system operates to display an instant messaging system application user interface that includes a lock session user interface display object, such as the Lock Session button 208 shown in FIG. 8. At step 274 the disclosed system detects user selection of the lock session user interface display object, for example in response to a session participant clicking on the Lock Session button 208. At step 276, the disclosed system enables the locking participant to select other session participants for which the session content is to be locked when the session is stored in a session transcript saved in a log file. Such selection may, for example, be provided through a display object similar to the Message Locking Participant Selection User Interface Display Object 220 of FIG. 9.

At step 278 the disclosed system locks the complete instant messaging session contents in the respective session transcript saved into a log file of each other participant selected by the locking participant at step 276. The locking may, for example, be accomplished by encryption of the session contents when it is stored in the session transcript saved to the log file. One or more session participants may then request the decryption key needed to unlock the locked session content at step 280, resulting in key request messages being sent to the locking user. While in a first embodiment, key requests may be sent to a locking user at step 280 through the instant messaging application by way of a feature provided in the instant messaging system application user interface and/or transcript viewing application user interface (e.g. key request option 248 in Instant Messaging Session Transcript Viewer Application User Interface 240), key requests may alternatively be provided through mechanisms external to the instant messaging system, including other types of communication applications (e.g. using e-mail messages).

Following step 280, the locking user can grant or deny the received individual key requests at step 282, thus allowing or disallowing the sending of the requested decryption key to the requesting user.

Figure 14:
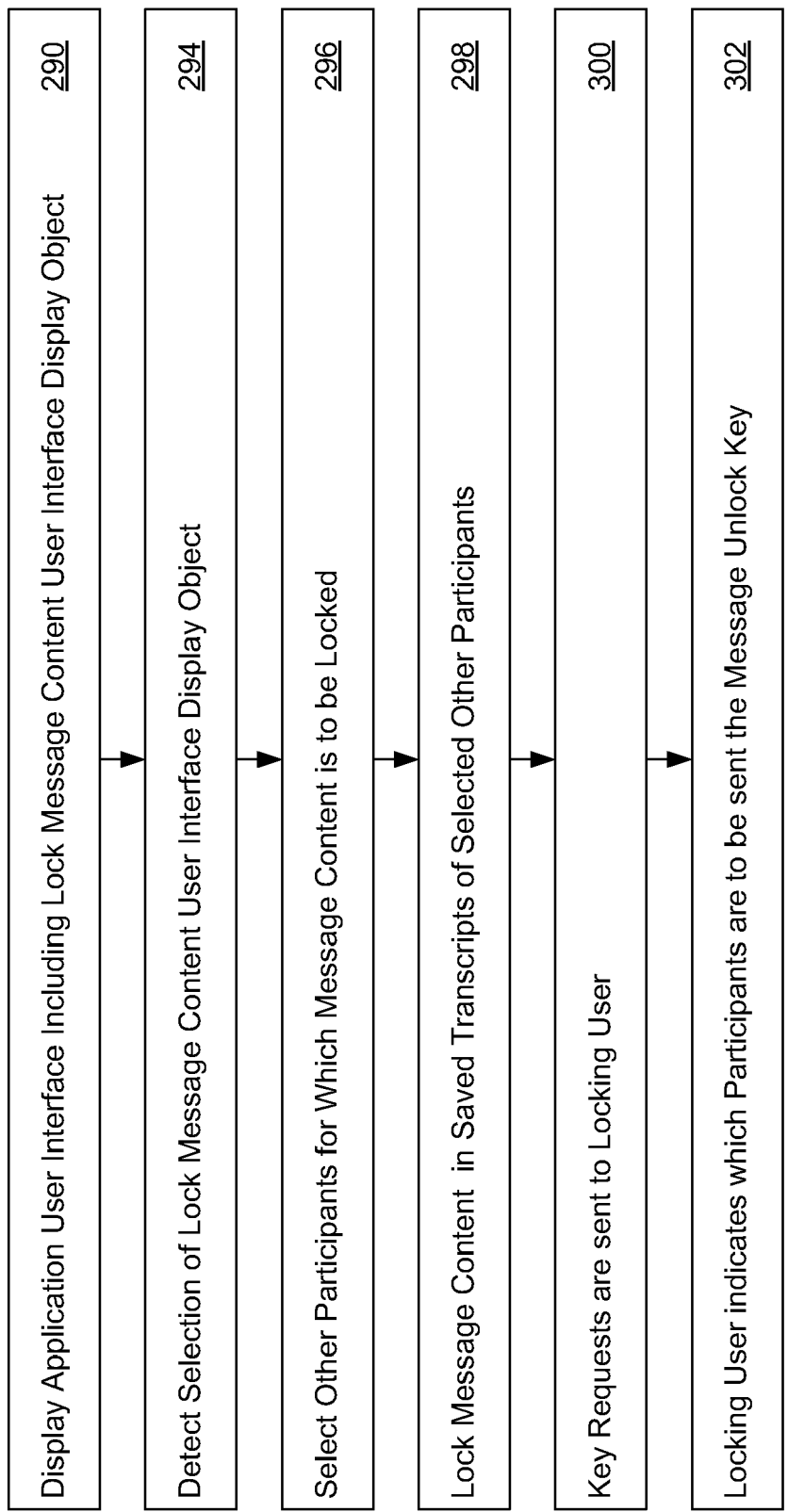
FIG. 14 is a flow chart showing steps performed to process a lock message command in an illustrative embodiment.

FIG. 14 is a flow chart showing steps performed during a lock message operation in an illustrative embodiment. At step 290, the disclosed system operates to display an instant messaging system application user interface that includes a lock message user interface display object, such as the Lock Line button 206 shown in FIG. 8. At step 294 the disclosed system detects user selection of the lock message user interface display object, for example in response to a session participant clicking on the Lock Line button 206. At step 296, the disclosed system enables the locking participant to select other session participants for which the currently selected line of content is to be locked when the session is stored into respective session transcripts stored in log files by those selected participants. Such selection may, for example, be provided through a user interface display object similar to the Message Locking Participant Selection User Interface Display Object 220 of FIG. 9.

At step 298 the disclosed system locks the selected line of content within an instant messaging session transcript saved into the log file of each other participant selected by the locking participant at step 296. The locking may, for example, be accomplished by encryption of the session contents when it is stored to the transcript history file. One or more session participants may then request the decryption key needed to unlock the locked session content in the log file at step 300, resulting in key request messages being sent to the locking user. While in a first embodiment, key requests may be sent to a locking user at step 300 through the instant messaging application by way of a feature provided in the instant messaging system application user interface and/or transcript viewing application user interface (e.g. key request option 248 in Instant Messaging Session Transcript Viewer Application User Interface 240), key requests may alternatively be provided through mechanisms external to the instant messaging system, including other types of communication applications (e.g. using e-mail messages).

The locking user can then grant or deny individual received key requests at step 302, causing or preventing the sending of the requested decryption key to the requesting users.

While the above description regarding illustrative embodiments of the disclosed system includes examples of specific user interface display objects, such as graphical buttons and the like, the present invention is not limited to those specific examples. Accordingly, those skilled in the art will recognize that alternative embodiments may use any specific type or kind of user interface display object that may be appropriate.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method of controlling the visual display of content for an instant messaging session, comprising:
displaying a clear visible content user interface object enabling a first participant in said instant messaging session to temporarily hide content displayed in a live session display area within an instant messaging session application user interface presented to a second participant during said instant messaging session;
responsive to said first participant selecting said clear visible content user interface object, temporarily hiding said content displayed in said live session display area within said instant messaging session user interface presented to said second participant, and displaying a retrieve temporarily hidden content user interface object in said instant messaging session user interface presented to said second participant, wherein said retrieve temporarily hidden content user interface object enables said second participant to recall said content displayed in said live session display area within said instant messaging session user interface presented to said second participant after said content displayed in said live session display area within said instant messaging session user interface presented to said second participant has been temporarily hidden; and
wherein said clear visible content user interface display object comprises a user selectable clear visible content option, and wherein said visible content displayed in said live session display area within said instant messaging session application user interface presented to said second participant is temporarily hidden responsive to said first participant selecting said clear visible content option.

2. The method of claim 1, wherein said clear visible content option comprises a clear visible content graphical button, and wherein said visible content displayed in said live session display area within said instant messaging session application user interface presented to said second participant is temporarily hidden responsive to said first participant clicking on said clear visible content graphical button.

3. The method of claim 1, further comprising:
displaying an expire visible content user interface object enabling said first participant to cause said visible content displayed in said live session display area within said instant messaging session application user interface presented to said second participant to be temporarily hidden upon satisfaction of a specified criteria.

4. The method of claim 3, wherein said specified criteria comprises a user selectable period of time, and wherein said specified criteria is satisfied when said period of time expires.

5. The method of claim 3, wherein said specified criteria comprises a user selectable time period of participant inactivity, and wherein said specified criteria is satisfied when said second participant has been inactive for said time period of user inactivity.

6. The method of claim 3, wherein said expire visible content user interface display object comprises an expire visible content graphical button, and wherein said visible content displayed in said live session display area within said instant messaging session application user interface presented to said second participant is temporarily hidden responsive to said first participant clicking on said expire visible content graphical button and said specified criteria being met.

7. The method of claim 3, further comprising:
displaying a visible content to expire user interface object to said second participant in response to said first participant clicking on said expire visible content graphical button, said visible content to expire user interface object informing said second participant that said visible content displayed in said live session display area within said instant messaging session application user interface presented to said second participant will be temporarily hidden upon satisfaction of said specified criteria.

8. The method of claim 7, wherein said visible content to expire user interface object further enables said second participant to prevent said visible content displayed in said live session display area within said instant messaging session application user interface presented to said second participant from being temporarily hidden upon satisfaction of said specified criteria.

9. The method of claim 8, wherein said visible content to expire user interface object comprises a dialog box display object presented to said second participant.

10. The method of claim 1, wherein said retrieve temporarily hidden content user interface object comprises a retrieve temporarily hidden content graphical button, and wherein said content displayed in said live session display area is restored responsive to said second participant clicking on said retrieve temporarily hidden content graphical button.

11. The method of claim 10, further comprising:
displaying a restore challenge user interface object to said second participant in response to said second participant clicking on said retrieve temporarily hidden content graphical button, wherein said restore challenge user interface object requires said second participant to provide authentication credentials prior to retrieval of said previously cleared visible content into said transcript area.

12. The method of claim 1, further comprising:
displaying an approve clearing user interface object to said second participant in response to said first participant clicking on said clear visible content graphical button, said approve clearing user interface object enabling said second participant to prevent said visible content displayed in said transcript area from being temporality hidden.

13. The method of claim 12, wherein said approve clearing user interface object is a dialog box display object presented to said second participant.

14. The method of claim 2, further comprising:
determining, responsive to said first participant clicking on said clear content graphical button, whether said live session display area of said application user interface provided to said second participant can be temporarily hidden; and
displaying, to said first participant responsive to a determination that said live session display area of said application user interface provided to said second participant cannot be temporarily hidden, an alert display object indicating that said live session display area of said application user interface provided to said second participant cannot be temporarily hidden.

15. The method of claim 6, further comprising:
determining, responsive to said first participant clicking on said expire visible content graphical button, whether said live session display area of said application user interface provided to said second participant can be temporarily hidden; and
displaying, to said first participant responsive to a determination that said live session display area of said application user interface provided to said second participant cannot be temporarily hidden, an alert display object indicating that said live session display area of said application user interface provided to said second participant cannot be temporarily hidden.

16. A computer system including at least one non-signal computer readable storage medium, said computer readable storage medium having computer program code stored thereon, which when executed would cause said computer system to control the visual display of content for an instant messaging session, said program code comprising:
temporarily hide visible content user interface object display logic for displaying a clear visible content user interface object enabling a first participant in said instant messaging session to temporarily hide visible content displayed in a live session display area within an instant messaging session application user interface presented to a second participant during said instant messaging session, and for, responsive to said first participant selecting said clear visible content user interface object, temporarily hiding said content displayed in said live session display area within said instant messaging session user interface presented to said second participant, and displaying a retrieve temporarily hidden content user interface object in said instant messaging session user interface presented to said second participant, wherein said retrieve temporarily hidden content user interface object enables said second participant to recall said content displayed in said live session display area within said instant messaging session user interface presented to said second participant after said content displayed in said live session display area within said instant messaging session user interface presented to said second participant has been temporarily hidden; and
wherein said clear visible content user interface display object comprises a user selectable clear visible content option, and wherein said visible content displayed in said live session display area within said instant messaging session application user interface presented to said second participant is temporarily hidden responsive to said first participant selecting said clear visible content option.

17. A computer program product including a non-signal computer readable storage medium, said computer readable storage medium having computer program code stored thereon, which when executed would cause said computer system to control the visual display of content for an instant messaging session, said program code comprising:
temporarily hide visible content user interface object display logic for displaying a clear visible content user interface object enabling a first participant in said instant messaging session to clear visible content displayed in a live session display area within an instant messaging session application user interface presented to a second participant during said instant messaging session, and for, responsive to said first participant selecting said clear visible content user interface object, temporarily hiding said content displayed in said live session display area within said instant messaging session user interface presented to said second participant, and displaying a retrieve temporarily hidden content user interface object in said instant messaging session user interface presented to said second participant, wherein said retrieve temporarily hidden content user interface object enables said second participant to recall said content displayed in said live session display area within said instant messaging session user interface presented to said second participant after said content displayed in said live session display area within said instant messaging session user interface presented to said second participant has been temporarily hidden; and
wherein said clear visible content user interface display object comprises a user selectable clear visible content option, and wherein said visible content displayed in said live session display area within said instant messaging session application user interface presented to said second participant is temporarily hidden responsive to said first participant selecting said clear visible content option.

\* \* \* \* \*